(12) United States Patent (10) Patent No.: US 11,279,436 B2
Honda et al. (45) Date of Patent: Mar. 22, 2022

(54) CONTROL SYSTEM FOR HUMAN-POWERED VEHICLE

(71) Applicant: SHIMANO Inc., Sakai (JP)

(72) Inventors: Masahiro Honda, Sakai (JP); Hideaki Yao, Sakai (JP); Satoshi Shahana, Sakai (JP); Katsuhiro Tachibana, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 17/066,071

(22) Filed: Oct. 8, 2020

(65) Prior Publication Data

US 2021/0024168 A1 Jan. 28, 2021

Related U.S. Application Data

(62) Division of application No. 16/376,151, filed on Apr. 5, 2019, now Pat. No. 10,829,179.

(51) Int. Cl.
*B60K 23/06* (2006.01)
*B62K 23/06* (2006.01)
*B62M 25/04* (2006.01)

(52) U.S. Cl.
CPC ............. *B62K 23/06* (2013.01); *B62M 25/04* (2013.01)

(58) Field of Classification Search
None
See application file for complete search history.

(56) References Cited

U.S. PATENT DOCUMENTS

| 5,356,348 | A | * | 10/1994 | Bellio | B62M 9/12 280/238 |
| 7,614,971 | B2 | * | 11/2009 | Fujii | B62M 25/045 474/70 |
| 7,900,946 | B2 | * | 3/2011 | Hara | B62M 9/122 280/260 |
| 8,321,097 | B2 | * | 11/2012 | Vasiliotis | B62M 6/40 701/51 |

(Continued)

FOREIGN PATENT DOCUMENTS

| DE | 102015206037 B3 * | 8/2016 | B62M 6/45 |
| EP | 2511166 A1 * | 10/2012 | B62M 9/123 |

(Continued)

*Primary Examiner* — Dirk Wright
(74) *Attorney, Agent, or Firm* — Alleman Hall Creasman & Tuttle LLP

(57) ABSTRACT

A control system for a human-powered vehicle includes an input device, an additional input device, and a controller. The input device is configured to receive manual input from a rider. The additional input device is configured to receive manual input from the rider. The controller is configured to control a shifting device of the human-powered vehicle based on one of an output signal from the input device and an output signal from the additional input device. The controller is configured to output one of a first control signal for a single shifting operation and a second control signal for a multiple shifting operation in response to the manual input received by one of the input device and the additional input device. The controller is further configured to output one of a first control signal and a second control signal based on a state of the human-powered vehicle.

7 Claims, 6 Drawing Sheets

(56) References Cited

U.S. PATENT DOCUMENTS

| | | | | |
|---|---|---|---|---|
| 8,475,305 | B2* | 7/2013 | Ichida | B62M 25/045 |
| | | | | 474/70 |
| 8,831,810 | B2* | 9/2014 | Shoge | B62M 6/45 |
| | | | | 701/22 |
| 8,878,658 | B2* | 11/2014 | Hara | B62J 3/00 |
| | | | | 340/432 |
| 8,882,122 | B2* | 11/2014 | Emura | B62M 25/08 |
| | | | | 280/200 |
| 9,234,580 | B1* | 1/2016 | Usui | B62M 25/08 |
| 9,969,462 | B2* | 5/2018 | Hara | B62M 25/08 |
| 9,975,603 | B2* | 5/2018 | Bortolozzo | B62M 9/133 |
| 10,167,056 | B2* | 1/2019 | Hashimoto | B62M 9/132 |
| 10,370,061 | B2* | 8/2019 | Wesling | B62M 9/122 |
| 10,569,836 | B2* | 2/2020 | Hamed | F16D 41/30 |
| 10,780,945 | B2* | 9/2020 | Gao | B62M 6/45 |
| 10,836,453 | B2* | 11/2020 | Tsuchizawa | B62M 6/50 |
| 10,927,952 | B2* | 2/2021 | Shahana | B62M 9/122 |
| 11,027,792 | B2* | 6/2021 | Wesling | B62M 25/08 |
| 2019/0300103 | A1* | 10/2019 | Shahana | B62M 6/45 |

FOREIGN PATENT DOCUMENTS

| | | | | |
|---|---|---|---|---|
| EP | 2979970 A1 * | 2/2016 | | B62M 9/123 |
| KR | 20150011979 A * | 2/2015 | | |
| WO | WO-2020124280 A1 * | 6/2020 | | B62M 9/123 |

* cited by examiner

CONTROL SYSTEM FOR HUMAN-POWERED VEHICLE

CROSS REFERENCE TO RELATED APPLICATIONS

The present application is a divisional of U.S. patent application Ser. No. 16/376,151, filed Apr. 5, 2019, and entitled CONTROL SYSTEM FOR HUMAN-POWERED VEHICLE, the entire disclosure of which is hereby incorporated herein by reference for all purposes.

BACKGROUND

When operating a human-powered vehicle, it is desirable for a rider to be able to quickly and efficiently perform shifting operations to change the gear ratio and/or control settings for adjustable components in response to changing circumstances. It is further desirable for the gear ratio to be selected with regard to a state of the human-powered vehicle. A challenge exists in designing an efficient and effective system for quickly and easily changing the gear ratio of the human-powered vehicle transmission in response to rider input and a state of the human-powered vehicle.

SUMMARY

A control system for a human-powered vehicle developed to address the above identified issues is disclosed herein. In accordance with a first aspect of the present invention, the control system for a human-powered vehicle comprises an input device, an additional input device, and a controller. The input device is configured to receive manual input from a rider. The additional input device is configured to receive manual input from the rider. The controller is configured to control a shifting device of the human-powered vehicle based on one of an output signal from the input device and an output signal from the additional input device. The controller is configured to output one of a first control signal for a single shifting operation and a second control signal for a multiple shifting operation in response to the manual input received by the input device, and the controller is configured to output the second control signal in response to the manual input received by the additional input device.

With the control system for a human-powered vehicle according to the first aspect, it is possible for a rider to select the single shifting operation or the multiple shifting operation of the human-powered vehicle.

In accordance with a second aspect of the present invention, the control system for a human-powered vehicle according to the first aspect is further configured in a manner such that the controller is further configured to control an adjustable component based on a riding position of the rider in response to the manual input received by the additional input device.

With the control system for a human-powered vehicle according to the second aspect, it is possible for a rider to change the setting of the adjustable component via manual input.

In accordance with a third aspect of the present invention, the control system for a human-powered vehicle according to the second aspect is configured in a manner such that the adjustable component includes an adjustable seatpost.

With the control system for a human-powered vehicle according to the third aspect, it is possible for a rider to change the setting of the adjustable seatpost via manual input.

In accordance with a fourth aspect of the present invention, the control system for a human-powered vehicle according to any one of the first to third aspects is configured in a manner such that the shifting device includes a derailleur having a chain guide and an actuator configured to move the chain guide to a plurality of shift positions. The plurality of shift positions includes a first shift position, a second position that is adjacent to the first shift position such that there is no shift position between the first and second shift positions, and a third shift position different from the first and second shift positions, with the second shift position being arranged between the first and third shift positions. The actuator moves the chain guide from the first shift position to the second shift position as the derailleur receives the first control signal, and the actuator moves the chain guide from the first shift position to the third shift position as the derailleur receives the second control signal.

With the control system for a human-powered vehicle according to the fourth aspect, it is possible for a rider to change the position of the chain guide from the first shift position to the third shift position in one shifting operation.

In accordance with a fifth aspect of the present invention, a control system for a human-powered comprises an input device and a controller. The input device is configured to receive manual input from a rider, and the controller is configured to control a shifting device of the human-powered vehicle based on an output signal from the input device. As the controller receives the output signal from the input device, the controller is configured to output one of a first control signal and a second control signal based on a state of the human-powered vehicle.

With the control system for a human-powered vehicle according to the fifth aspect, it is possible to select the shifting operation with regard to the circumstances of the human-powered vehicle.

In accordance with a sixth aspect of the present invention, the control system for a human-powered vehicle according to the fifth aspect is configured in a manner such that the first control signal is for a single shifting operation, and the second control signal is for a multiple shifting operation.

With the control system for a human-powered vehicle according to the sixth aspect, it is possible for a rider to select the single shifting operation or the multiple shifting operation of the human-powered vehicle.

In accordance with a seventh aspect of the present invention, the control system for a human-powered vehicle according to the fifth or sixth aspect is configured in a manner such that the state of the human-powered vehicle includes at least one of an inclination, a cadence, an acceleration, an input torque, a posture of the rider, GPS information, a forward velocity, an operational state of one or more components of the human-powered vehicle, and a forward state of the human-powered vehicle.

With the control system for a human-powered vehicle according to the seventh aspect, it is possible to consider at least one circumstance of the human-powered vehicle when selecting the shifting operation to be performed.

In accordance with an eighth aspect of the present invention, the control system for a human-powered vehicle according to the seventh aspect is configured in a manner such that the state of the human-powered vehicle includes an expected speed stage of the shifting device based on the forward velocity.

With the control system for a human-powered vehicle according to the eighth aspect, it is possible to select the shifting operation in anticipation of the speed stage of the shifting device.

In accordance with a ninth aspect of the present invention, the control system for a human-powered vehicle according to the seventh or eighth aspect is configured in a manner such that the output signal of the input device includes an upshift signal, the second control signal includes a second upshift control signal for increasing a gear ratio of the human-powered vehicle, and, as the controller receives the upshift signal and a change rate of inclination is decreased, the controller outputs the second upshift control signal.

With the control system for a human-powered vehicle according to the ninth aspect, it is possible to upshift via the multiple shifting operation when a downhill circumstance is detected.

In accordance with a tenth aspect of the present invention, the control system for a human-powered vehicle according to any one of the seventh to ninth aspects is configured in a manner such that the output signal of the input device includes a downshift signal, the second control signal includes a second downshift control signal for decreasing a gear ratio of the human-powered vehicle, and, as the controller receives the downshift signal and a change rate of inclination is increased, the controller outputs the second downshift control signal.

With the control system for a human-powered vehicle according to the tenth aspect, it is possible to downshift via the multiple shifting operation when an uphill circumstance is detected.

In accordance with an eleventh aspect of the present invention, the control system for a human-powered vehicle according to any one of the sixth to tenth aspects further comprises a notification device configured to notify the rider of the multiple shifting operation prior to actuation of the shifting device.

With the control system for a human-powered vehicle according to the eleventh aspect, it is possible for a rider to dismiss an intended multiple shifting operation.

In accordance with a twelfth aspect of the present invention, the control system for a human-powered vehicle according to any one of the fifth to eleventh aspects is configured in a manner such that the shifting device includes a derailleur having a chain guide and an actuator configured to move the chain guide to a plurality of the shift positions. The plurality of the shift positions includes a first shift position, a second position that is adjacent to the first shift position such that there is no shift position between the first and second shift positions, and a third shift position different from the first and second shift positions, with the second shift position being arranged between the first and third shift positions. The actuator moves the chain guide from the first shift position to the second shift position as the derailleur receives the first control signal, and the actuator moves the chain guide from the first shift position to the third shift position as the derailleur receives the second control signal.

With the control system for a human-powered vehicle according to the twelfth aspect, it is possible for a rider to change the position of the chain guide from the first shift position to the third shift position in one shifting operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. The term "human-powered vehicle," as used herein, refers to non-electric or electric assist-enabled vehicles regardless of the number of their wheels, but does not include four-wheeled vehicles having an internal combustion engine as a power source for driving the wheels, or four-wheeled electric vehicles that require a license to operate on public roads.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Figure 1:
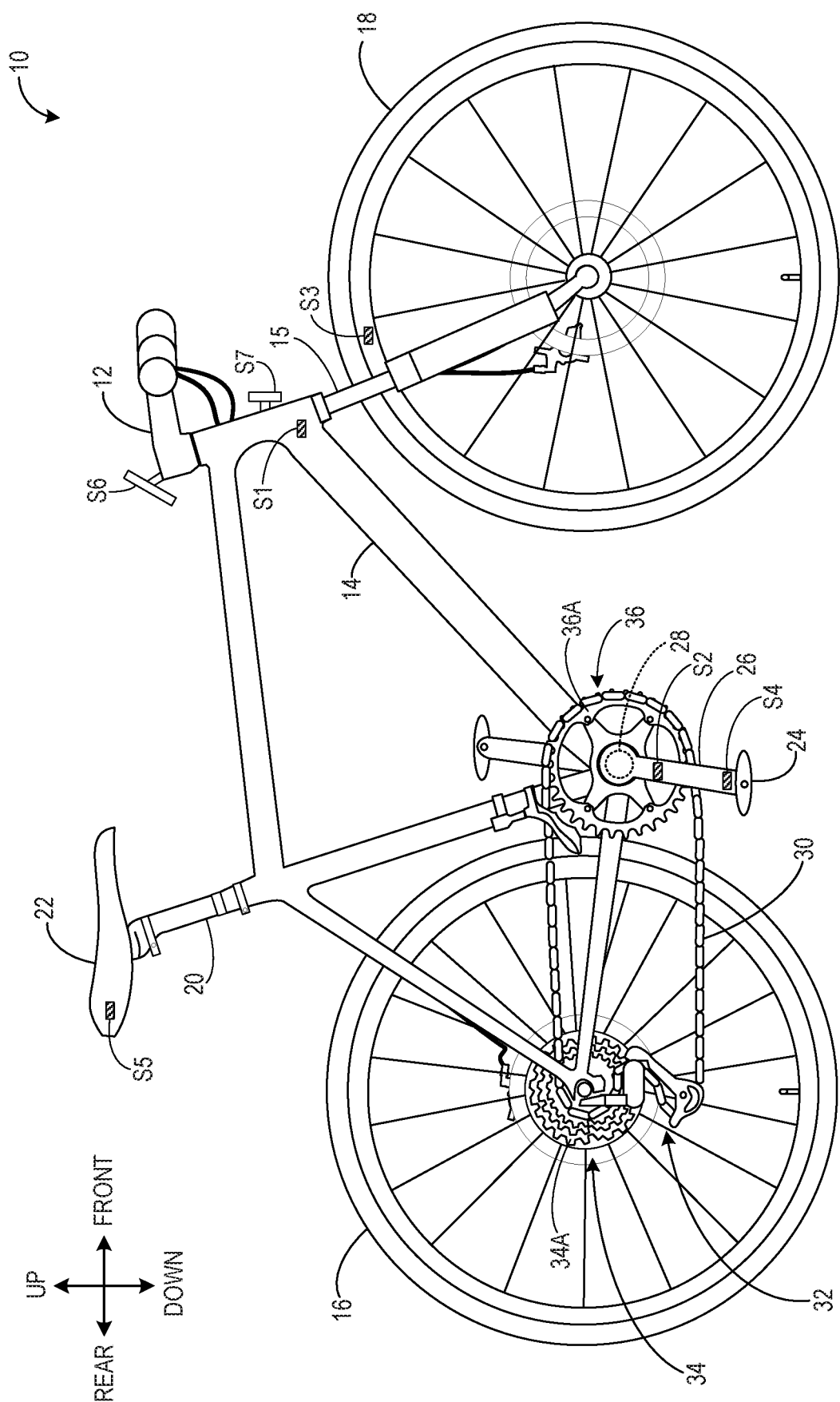
FIG. 1 is a right side elevation view of an example human-powered vehicle incorporating a control system according to the present disclosure.

Selected embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

Referring initially to FIG. 1, an exemplary human-powered vehicle 10 according to at least one disclosed embodiment of the present invention is shown. The human-powered vehicle 10 is, for example, a bicycle, such as an off-road bicycle such as a cyclocross bicycle or mountain bike. Alternatively, the human-powered vehicle 10 may be a road type bicycle, a scooter, a velomobile, or a handcar, for example. As shown in the schematic outline of FIG. 2, the human-powered vehicle 10 may have an axial center plane P1 defining left and right halves of the human-powered vehicle 10. The following directional terms "front," "rear," "forward," "rearward," "left," "right," "inward," "outward," "transverse," "upward," and "downward," as well as any other similar directional terms, refer to those directions which are determined on the basis of a rider sitting upright on a saddle of the human-powered vehicle 10 while facing a handlebar 12, for example.

Continuing with FIG. 1, the human-powered vehicle 10 includes a frame 14, a front fork 15 rotatably attached to the frame 14, a rear wheel 16 rotatably attached to the frame 14, a front wheel 18 rotatably attached to the front fork 15, and a seatpost 20 attached to the frame 14 and supporting a seat 22. In the embodiment described herein, the seatpost 20 is configured as an adjustable seatpost. Pedals 24 on either side of the frame 14 are attached to corresponding crank arms 26. The crank arms 26 are mounted on either side of the frame 14 at 180 degrees from one another and are connected by a crank axle 28 (indicated by the dotted line). The crank axle 28 is rotatably attached to the frame 14 via a bottom bracket assembly. The human-powered vehicle 10 of the present embodiment is driven by a chain drive transmission system that includes a chain 30, a shifting device 32, a rear sprocket assembly 34 including a plurality of rear sprockets 34A, and a front sprocket assembly 36 including at least one front sprocket 36A. The chain 30 engages with one rear sprocket 34A of the rear sprocket assembly 34 and the at least one front sprocket 36A of the front sprocket assembly 36. A driving force applied to the pedals 24 is transferred to the crank arms 26, which rotate the crank axle 28 and the front sprocket assembly 36. As the front sprocket assembly 36 rotates, the chain 30 is driven around one rear sprocket 34A of the rear sprocket assembly 34, which transmits power to the rear wheel 16 to propel the human-powered vehicle 10. The shifting device 32 is configured to move the chain 30 among the rear sprockets 34A to increase or decrease a gear ratio of the human-powered vehicle 10, as described below. As described in detail below, the human-powered vehicle 10 includes sensors S1, S2, S3, S4, S5, S6, and S7 to provide real-time information regarding a state of the human-powered vehicle 10. Other parts of the human-powered vehicle 10 are well known and are not described herein.

Figure 3:
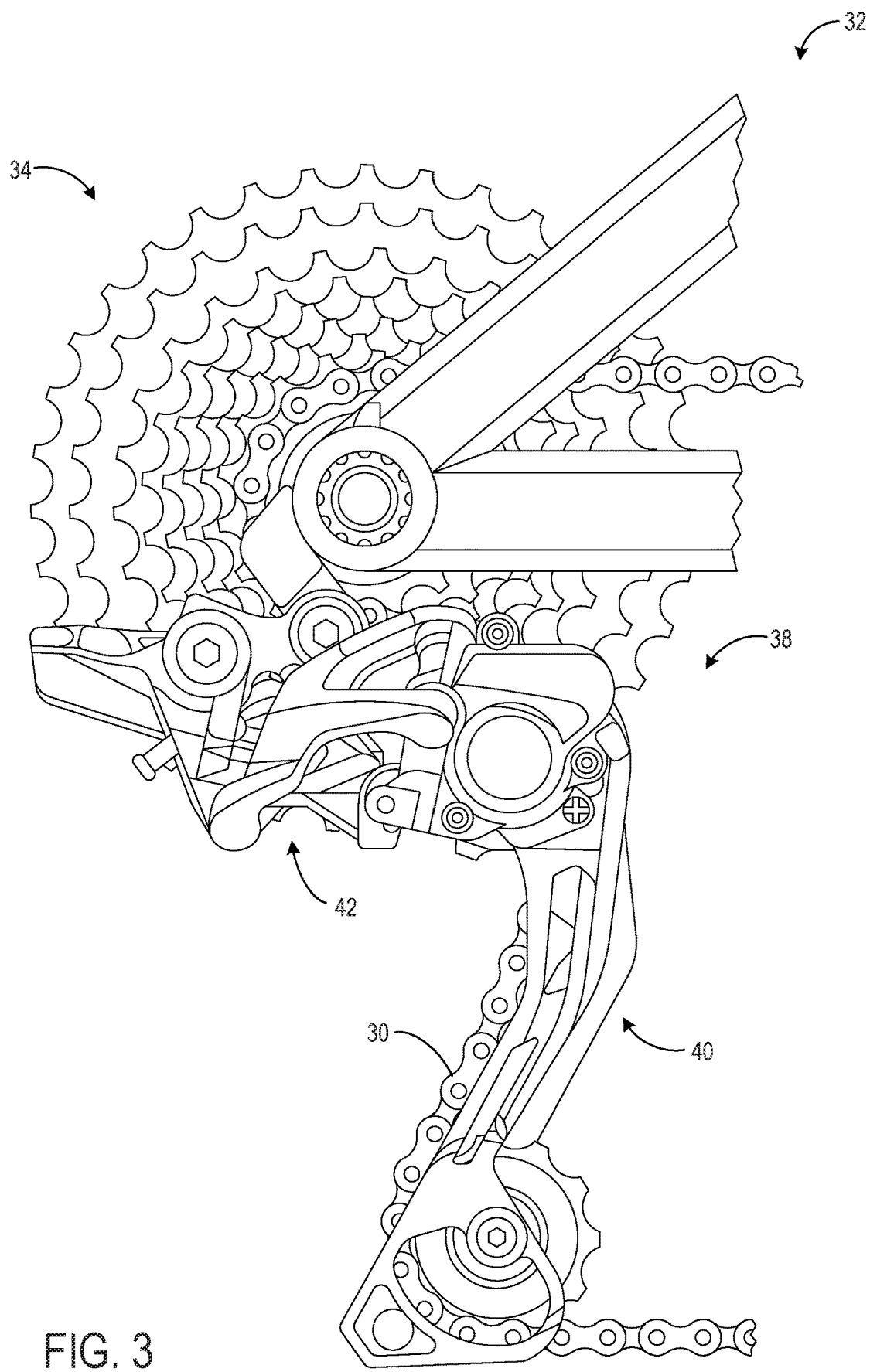
FIG. 3 is a shifting device according to the present disclosure.

As shown in FIG. 3 and discussed above with reference to FIG. 1, the shifting device 32 includes a derailleur 38 having a chain guide 40 and an actuator 42. The actuator 42 is configured to move the chain guide 40 to a plurality of shift positions, as described in detail below with reference to FIG. 6. As the chain guide 40 moves, the chain 30 is transferred from one rear sprocket 34A of the rear sprocket assembly 34 to another rear sprocket 34A of the rear sprocket assembly 34 to increase or decrease the gear ratio of the human-powered vehicle 10, which determines the number of rotations of the rear wheel 16, and thus the distance the rear wheel 16 travels, for each rotation of the crank arms 26. In an upshift operation, the chain 30 is transferred in an outward direction to a smaller rear sprocket of the rear sprocket assembly 34, and the gear ratio of the human-powered vehicle 10 increases. Similarly, in a downshift operation, the chain 30 is transferred in an inward direction to a larger sprocket of the cassette of rear sprockets 34, and the gear ratio of the human-powered vehicle 10 decreases.

Figure 4:
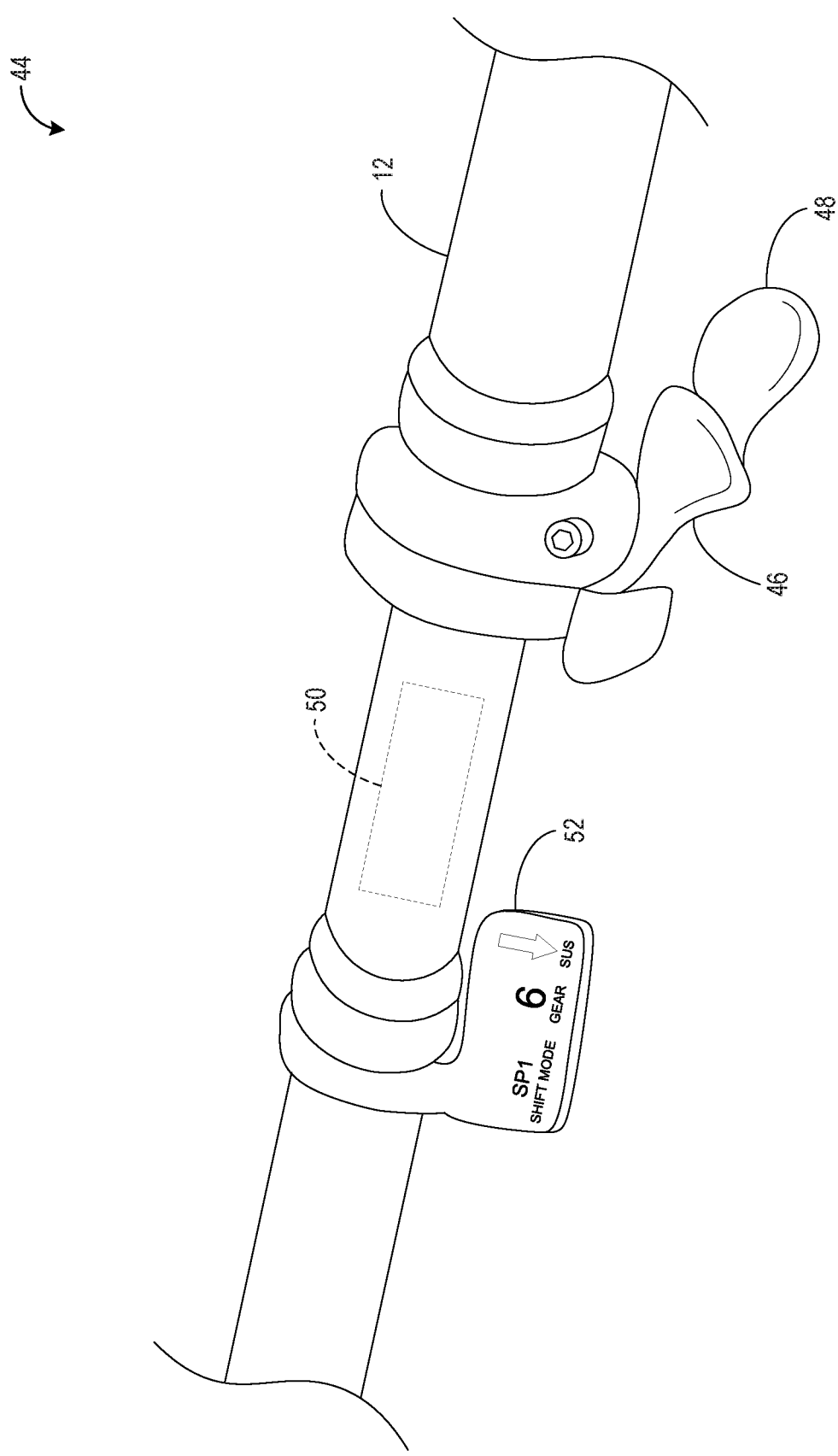
FIG. 4 is a control system according to the present disclosure.

The human-powered vehicle 10 includes a control system 44. As described in detail below, the control system 44 includes an input device 46, an additional input device 48, and a controller 50 that is configured to control the shifting device 32. As shown in FIG. 4, the input device 46 and the additional input device 48 are configured as adjacent levers mounted on the handlebar 12. However, it will be appreciated that the input device 46 and/or the additional input device 48 may be alternately configured as a button, a dial, or a touch-sensitive digital device, for example. It will be further appreciated that the input device 46 and/or the additional input device 48 may be mounted on the human-powered vehicle 10 at a location other than the handlebar 12, or integrated into the frame of the human-powered vehicle. In the embodiment shown in FIG. 4, the controller 50 is mounted inside the handlebar 12 near the input device 46 and additional input device 48, as indicated by the dashed lines. However, it will be appreciated that the controller 50 may be mounted inside the frame 14 at an alternate location, or mounted on the frame 14 of the human-powered vehicle 10, for example. The control system 44 further includes a notification device 52 to notify a rider of a status of the shifting device 32, such as a shift mode or a current speed stage. In the embodiment of FIG. 4, the notification device 52 is configured as a digital device mounted on the handlebar 12. However, it will be appreciated that the notification device 52 may be mounted on the human-powered vehicle 10 at a location other than the handlebar 12.

Figure 5:
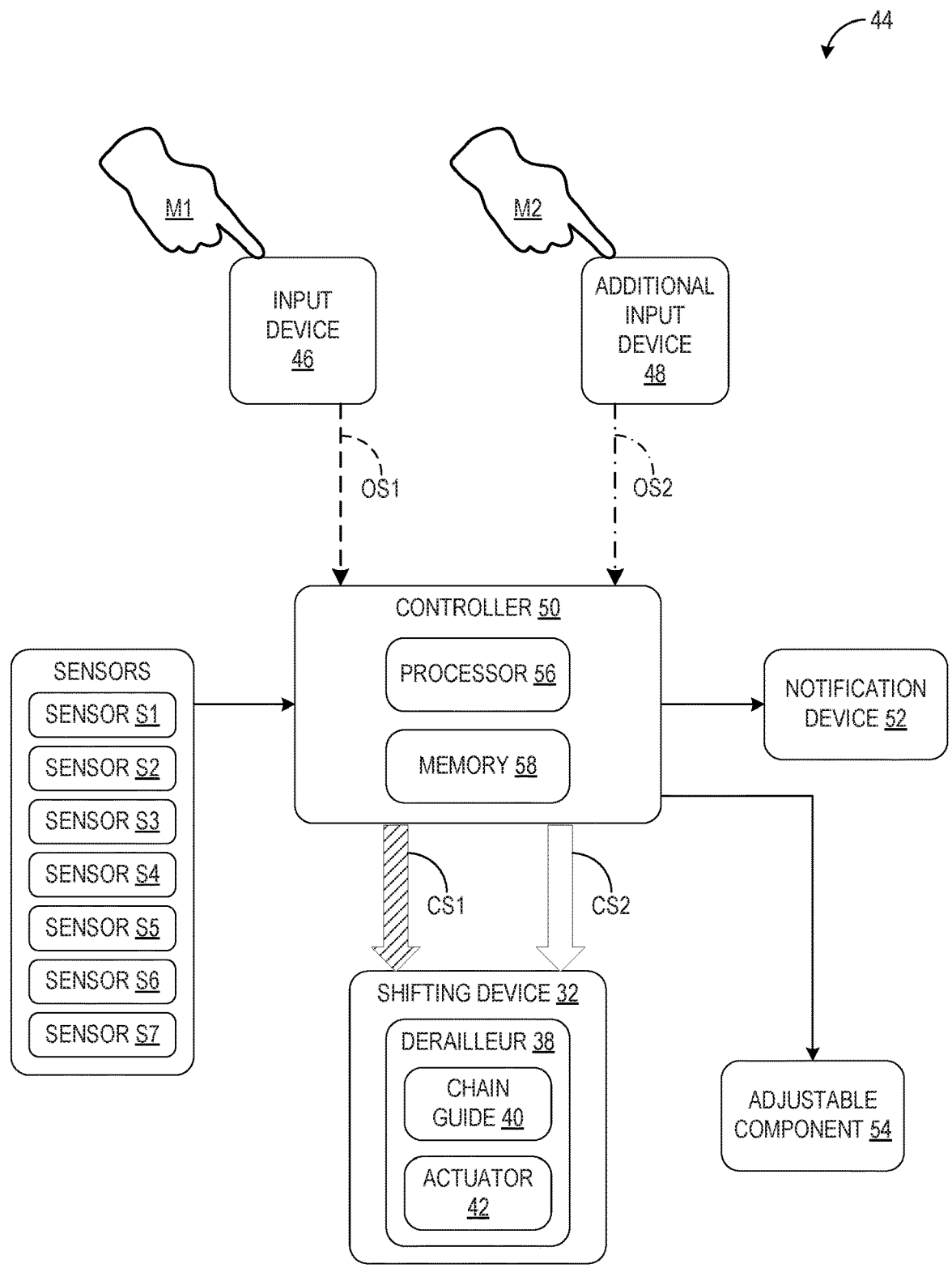
FIG. 5 is a schematic block diagram of a control system according to the present disclosure.

Turning to FIG. 5, a schematic representation of the control system 44 for the human-powered vehicle 10 is shown. As discussed above, the control system 44 comprises the input device 46, the additional input device 48, and the controller 50. The input device 46 is configured to receive manual input M1 from the rider, which is communicated to the controller 50 as an output signal OS1, as indicated by the dashed arrow in FIG. 5. Likewise, the additional input device 48 is configured to receive manual input M2 from the rider, which is communicated to the controller 50 as an output signal OS2, as indicated by the dashed dot arrow in FIG. 5.

The controller 50 is configured to control the shifting device 32 of the human-powered vehicle 10 based on one of the output signal OS1 from the input device 46 and the output signal OS2 from the additional input device 48. As illustrated in FIG. 5, the controller 50 outputs one of a first control signal CS1 (indicated by the hatched arrow) and a second control signal CS2 (indicated by the open arrow) to the shifting device 32. Specifically, the controller 50 is configured to output one of the first control signal CS1 and the second control signal CS2 in response to the manual input M1 received by the input device 46, and the controller 50 is configured to output the second control signal CS2 in response to the manual input M2 received by the additional input device 48. As described in detail below, the first control signal CS1 is for a single shifting operation SSO, and the second control signal CS2 is for a multiple shifting operation MSO. As discussed above and shown in FIG. 5, the control system further comprises the notification device 52. As described above with reference to FIG. 4, the notification device may be a digital device mounted on the handlebar 12 that is configured to notify the rider of the multiple shifting operation MSO prior to actuation of the shifting device 32.

In some embodiments, as the controller 50 receives the output signal OS1 from the input device 46, the controller 50 is configured to output one of the first control signal CS1 and the second control signal CS2 based on a state of the human-powered vehicle 10. The state of the human-powered vehicle 10 includes at least one of an inclination, a cadence, an acceleration, an input torque, a posture of the rider, GPS information, a forward velocity, an operational state of one or more components of the human-powered vehicle 10, and a forward state of the human-powered vehicle 10. As discussed above with reference to FIG. 1, the human-powered vehicle 10 is equipped with sensors S1, S2, S3, S4, S5, S6, and S7 to provide real-time information regarding the state of the human-powered vehicle 10 to the controller 50.

Sensor S1 is implemented as an inertial measurement unit (IMU), which may include a combination of accelerometers, gyroscopes, and/or magnetometers. The IMU can detect motion in six degrees of freedom by measuring roll, pitch, and yaw, and thus functions to measure the inclination of the human-powered vehicle 10, as well as acceleration. In the embodiment of FIG. 1, sensor S1 is mounted in the frame 14 toward the front of the human-powered vehicle 10. However, it will be appreciated that sensor S1 may be arranged in a different location of the human-powered vehicle 10. In the field of human-powered vehicles, cadence is generally understood to mean the pedaling rate, which is the number of revolutions of the crank arms 26 per minute. Accordingly, and with continued reference to FIG. 1, the human-powered vehicle 10 is provided with sensor S2 mounted on or inside one of the crank arms 26 of the human-powered vehicle 10 to detect the cadence. It will be appreciated that the sensor S2 is not limited to a crank-based cadence meter and may be alternatively implemented as a pedal-based or a wheel-based cadence meter, although these are merely examples and not intended to be limiting. The human-powered vehicle 10 is equipped with sensor S3, such as a ground speed radar, for example, mounted on or inside the front wheel 18 to detect the acceleration and/or the forward velocity of the human-powered vehicle 10. However, the sensor S3 is not limited to this embodiment, and might be changed accordingly if needed and/or desired. For example, acceleration and forward velocity of the human-powered vehicle also can be detected by sensor S1, as described above. Like sensor S2, sensor S4 is mounted on or inside one of the crank arms 26 of the human-powered vehicle 10 to detect the input torque of the human-powered vehicle 10. Sensor S5 is configured as a pressure sensor or non-contact sensor mounted on or inside the seatpost 20 to indicate the seat height of the human-powered vehicle 10 and the posture of the rider. Sensor S6 is implemented as a global positioning system (GPS) mounted on the handlebar 12 of the human-powered vehicle and configured to provide GPS information regarding the human-powered vehicle 10. In some embodiments, the GPS may include an integrated IMU to measure acceleration and forward velocity of the human-powered vehicle 10. Sensor S7 is implemented as a camera mounted on the frame 14 of the human-powered vehicle 10 to provide information regarding the forward state of the human-powered vehicle 10, such as a road surface state, an obstacle, and the presence of another vehicle, for example.

Further, the state of the human-powered vehicle 10 includes an expected speed stage of the shifting device 32 based on the forward velocity. The controller 50 determines the expected speed stage based on a correspondence table between the forward velocity and the expected speed stage of the shifting device 32.

The controller 50 is further configured to control an adjustable component 54 based on a riding position of the rider in response to the manual input M2 received by the additional input device 48. In the embodiment described herein, the adjustable component 54 includes the adjustable seatpost 20 that is moved up or down according to the state of the bicycle and riding conditions. However, it will be appreciated that the embodiment of the adjustable component 54 is not limited to the adjustable seatpost and may additionally or alternatively include an adjustable suspension, frame, forks, swing arm, or the like, for example.

As shown in FIG. 5, the controller 50 may include a processor 56 and a memory 58 to process and store output signals OS1, OS2 received from the input device 46 and the additional input device 48, as well as the sensors. In any of the embodiments described herein, it will be appreciated that communication between any of the controller 50, the input device 46, the additional input device 48, the shifting device 32, the sensors, notification device, and the adjustable component 54 may occur via a wired mode, a wireless mode, or a combination of wired and wireless modes, depending upon the configurations of the components of the human-powered vehicle 10. The memory 58 stores the correspondence table between the forward velocity and the expected speed stage of the shifting device 32.

Figure 6:
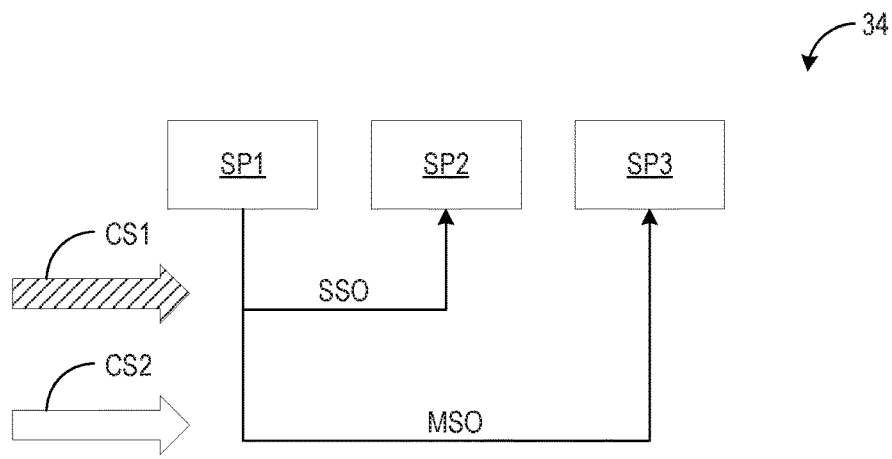
FIG. 6 is a schematic block diagram of shifting operations among a cassette of rear sprockets according to the present disclosure.

FIG. 6 shows a schematic representation of the rear sprocket assembly 34 represented as shift positions for shifting operations. As discussed above with reference to FIG. 3, the controller 50 is configured to control the actuator 42 of the shifting device 32 to move the chain guide 40 to a plurality of shift positions. As shown in FIG. 6, the plurality of shift positions includes a first shift position SP1, a second position SP2 that is adjacent to the first shift position SP1 such that there is no shift position between the first and second shift positions SP1, SP2, and a third shift position SP3 different from the first and second shift positions SP1, SP2. The second shift position SP2 is arranged between the first and third shift positions SP1, SP3.

Figure 2:
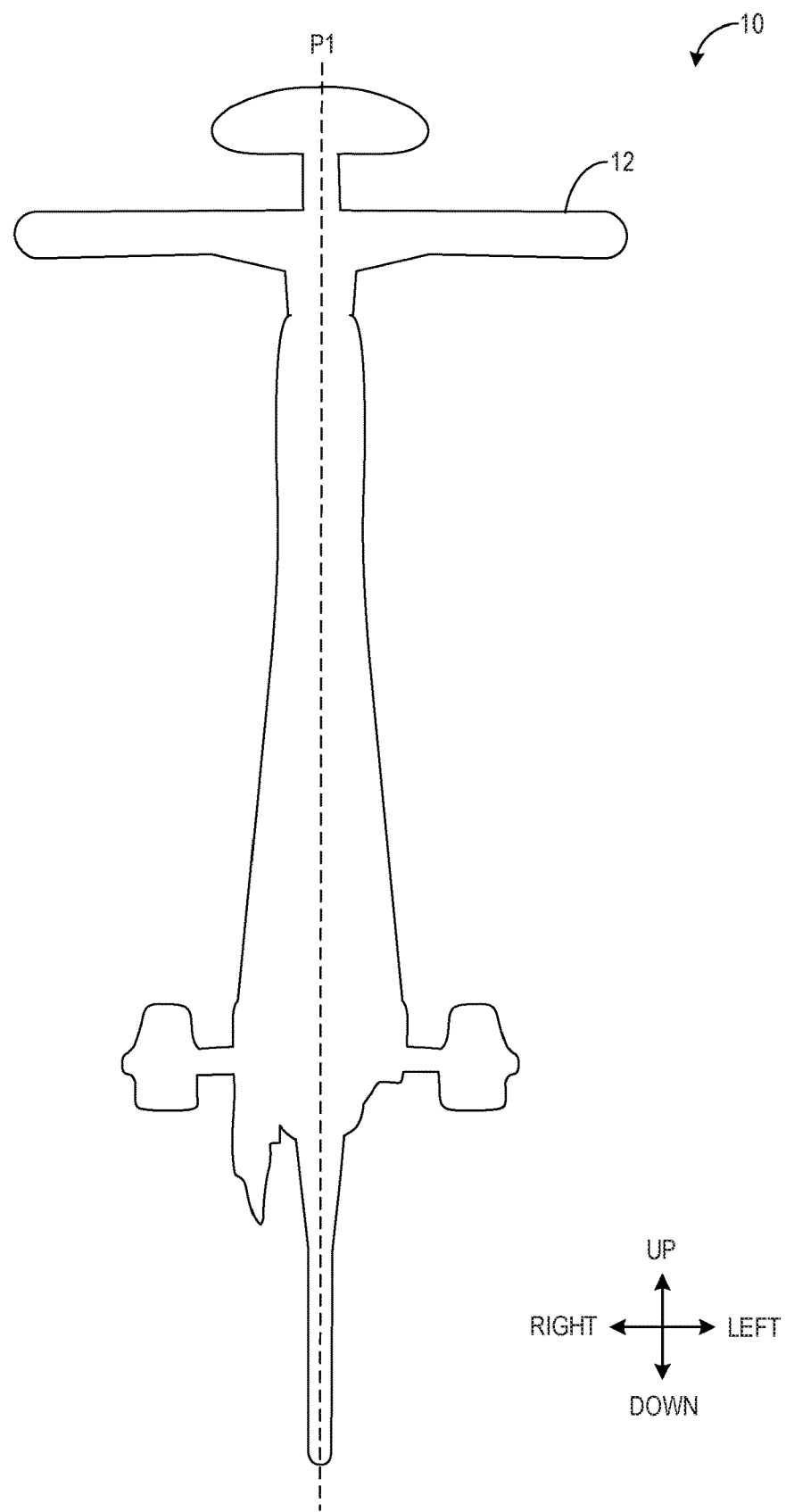
FIG. 2 is a schematic outline of a human-powered vehicle.

As the derailleur 38 receives the first control signal CS1 from the controller 50 for a single shifting operation SSO, the actuator 42 moves the chain guide 40 from the first shift position SP1 to the second shift position SP2. As the derailleur 38 receives the second control signal CS2 for a multiple shifting operation MSO, the actuator 42 moves the chain guide 40 from the first shift position SP1 to the third shift position SP3. It will be appreciated that the shifting direction, i.e. inward or outward with respect to the axial center plane P1 of the human-powered vehicle 10 as described in FIG. 2, is the same for the single shifting operation SSO and the multiple shifting operation MSO. It will be further appreciated that the designations of the shift positions, i.e., the first, second, and third shift positions SP1, SP2, SP3, are relative to the assignment of an initial shift position as the first shift position SP1.

Figure 7A:
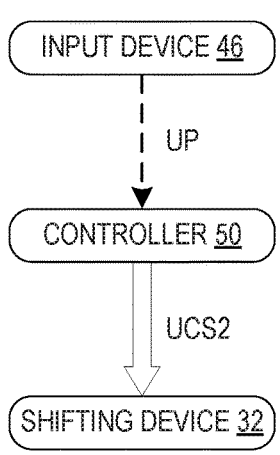
FIG. 7A is a schematic block diagram of an upshift operation according to the present disclosure.
Figure 7B:
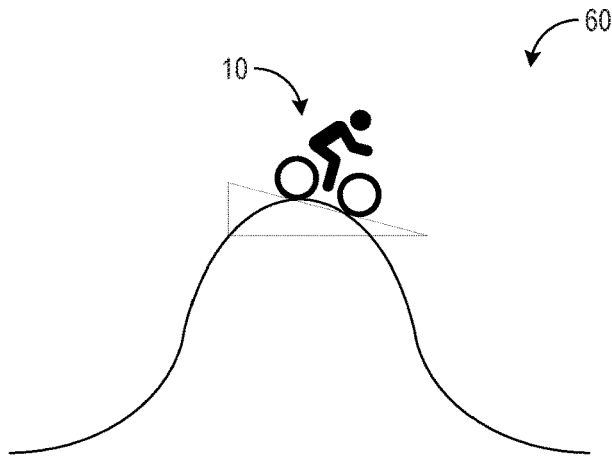
FIG. 7B is a graphical representation of a human-powered vehicle descending an incline according to the present disclosure.

FIG. 7A shows a schematic block diagram of an upshift operation 60. As discussed above, during the upshift operation 60, the actuator 42 moves the chain guide 40 such that the chain 30 is transferred to a smaller sprocket of the cassette of rear sprockets 34 in an outward direction to increase the gear ratio. In some embodiments of the control system 44, it may be beneficial to actuate a multiple shifting operation MSO when upshifting, such as when the rider of the human-powered vehicle 10 has reached the top of a hill and is beginning to descend, as shown in FIG. 7B. Accordingly, to accommodate such situations, the output signal OS1 of the input device 46 includes an upshift signal UP, and the second control signal CS2 includes a second upshift control signal UCS2 for increasing the gear ratio of the human-powered vehicle 10. As the controller 50 receives the upshift signal UP and a change rate of inclination is decreased, the controller 50 outputs the second upshift control signal UCS2 to the shifting device 32, which causes the actuator 42 to move the chain guide 40 from the first shift position SP1 to the third shift position SP3 in a multiple shifting operation MSO, as indicated in FIG. 7. The condition of the change rate of inclination decreasing is indicated in FIG. 7 by the dotted line triangle.

Figure 8A:
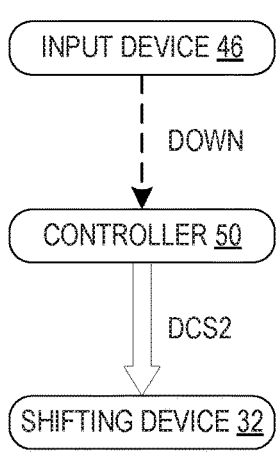
FIG. 8A is a schematic block diagram of a downshift operation according to the present disclosure.
Figure 8B:
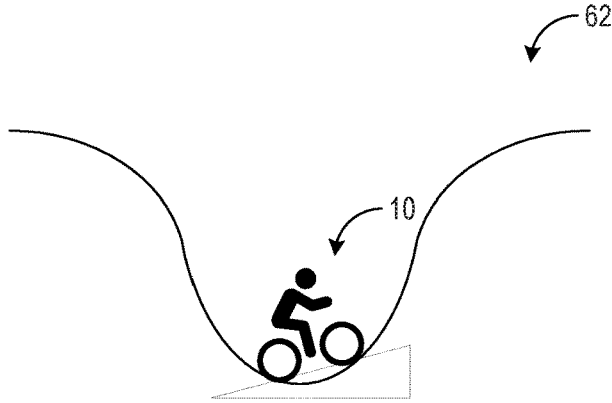
FIG. 8B is a graphical representation of a human-powered vehicle ascending an incline according to the present disclosure.

FIG. 8A shows a schematic block diagram of a downshift operation 62. As discussed above, during the downshift operation 62, the actuator 42 moves the chain guide 40 such that the chain 30 is transferred to a larger sprocket of the cassette of rear sprockets 34 in an inward direction to decrease the gear ratio. In some embodiments of the control system 44, it may be beneficial to actuate a multiple shifting operation MSO when downshifting, such as when the rider of the human-powered vehicle 10 is at the bottom of a hill and is beginning to ascend, as shown in FIG. 8B. Accordingly, to accommodate such situations, the output signal OS1 of the input device 46 includes a downshift signal DOWN, and the second control signal CS2 includes a second downshift control signal DCS2 for decreasing the gear ratio of the human-powered vehicle 10. As the controller 50 receives the downshift signal DOWN and a change rate of inclination is increased, the controller 50 outputs the second downshift control signal DCS2 to the shifting device 32, which causes the actuator 42 to move the chain guide 40 from the first shift position SP1 to the third shift position SP3 in a multiple shifting operation MSO, as indicated in FIG. 8. The condition of the change rate of inclination increasing is indicated in FIG. 8 by the dotted line triangle.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two elements, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A control system for a human-powered vehicle, comprising:
   an input device configured to receive manual input from a rider, and
   a controller configured to control a shifting device of the human-powered vehicle based on an output signal from the input device, wherein
   as the controller receives the output signal from the input device, the controller is configured to output one of a first control signal and a second control signal based on a state of the human-powered vehicle, and
   the first control signal is for a single shifting operation, and the second control signal is for a multiple shifting operation.

2. The control system according to claim 1, wherein the state of the human-powered vehicle includes at least one of an inclination, a cadence, an acceleration, an input torque, a posture of the rider, GPS information, a forward velocity, an operational state of one or more components of the human-powered vehicle, and a forward state of the human-powered vehicle.

3. The control system according to claim 2, wherein the state of the human-powered vehicle includes an expected speed stage of the shifting device based on the forward velocity.

4. The control system according to claim 1, wherein the control system further comprises a notification device configured to notify the rider of the multiple shifting operation prior to actuation of the shifting device.

5. The control system according to claim 1, wherein the shifting device includes a derailleur having a chain guide and an actuator configured to move the chain guide to a plurality of shift positions,
   the plurality of shift positions includes a first shift position, a second position that is adjacent to the first shift position such that there is no shift position between the first and second shift positions, and a third shift position different from the first and second shift positions, the second shift position is arranged between the first and third shift positions,
   the actuator moves the chain guide from the first shift position to the second shift position as the derailleur receives the first control signal, and
   the actuator moves the chain guide from the first shift position to the third shift position as the derailleur receives the second control signal.

6. A control system for a human-powered vehicle, comprising:
   an input device configured to receive manual input from a rider, and
   a controller configured to control a shifting device of the human-powered vehicle based on an output signal from the input device, wherein
   as the controller receives the output signal from the input device, the controller is configured to output one of a first control signal and a second control signal based on a state of the human-powered vehicle,
   the state of the human-powered vehicle includes at least one of an inclination, a cadence, an acceleration, an input torque, a posture of the rider, GPS information, a forward velocity, an operational state of one or more components of the human-powered vehicle, and a forward state of the human-powered vehicle,
   the output signal of the input device includes an upshift signal,
   the second control signal includes a second upshift control signal for increasing a gear ratio of the human-powered vehicle, and
   as the controller receives the upshift signal and a change rate of inclination is decreased, the controller outputs the second upshift control signal.

7. A control system for a human-powered vehicle, comprising:
   an input device configured to receive manual input from a rider, and
   a controller configured to control a shifting device of the human-powered vehicle based on an output signal from the input device, wherein
   as the controller receives the output signal from the input device, the controller is configured to output one of a first control signal and a second control signal based on a state of the human-powered vehicle,
   the state of the human-powered vehicle includes at least one of an inclination, a cadence, an acceleration, an input torque, a posture of the rider, GPS information, a forward velocity, an operational state of one or more components of the human-powered vehicle, and a forward state of the human-powered vehicle,
   the output signal of the input device includes a downshift signal,
   the second control signal includes a second downshift control signal for decreasing a gear ratio of the human-powered vehicle, and as the controller receives the downshift signal and a change rate of inclination is increased, the controller outputs the second downshift control signal.

* * * * *